Figure 1:
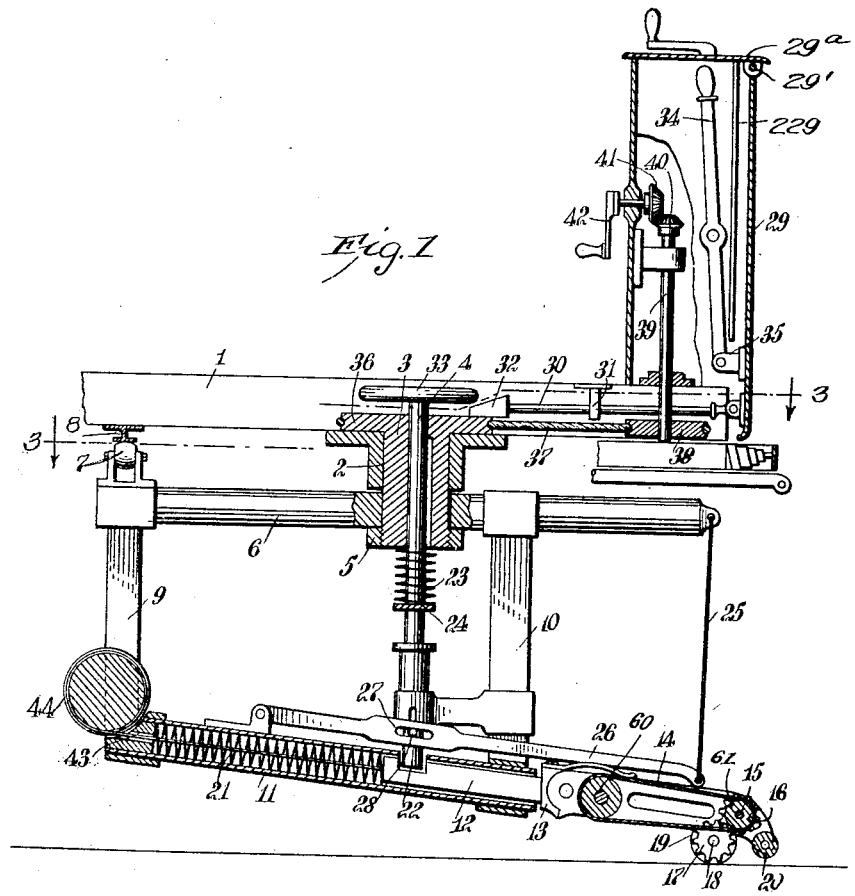

B. PÉDUCASSE.
AUTOMATIC FENDER.
APPLICATION FILED DEC. 13, 1909.

1,107,995.

Patented Aug. 18, 1914.

3 SHEETS—SHEET 1.

WITNESSES:
G. Robert Thomas
H. Whiting

INVENTOR
Bernard Péducasse
BY Munn & Co
ATTORNEYS

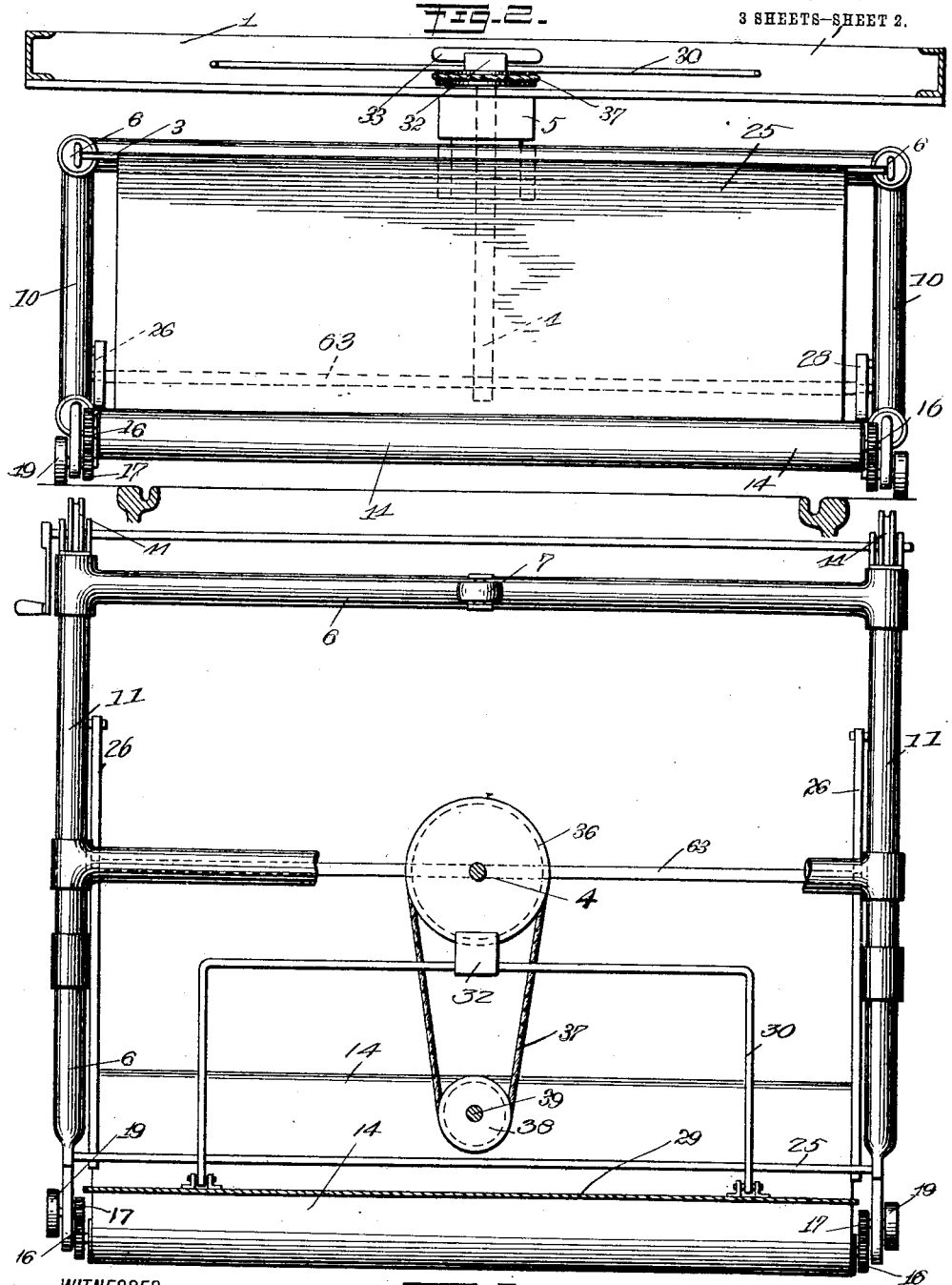

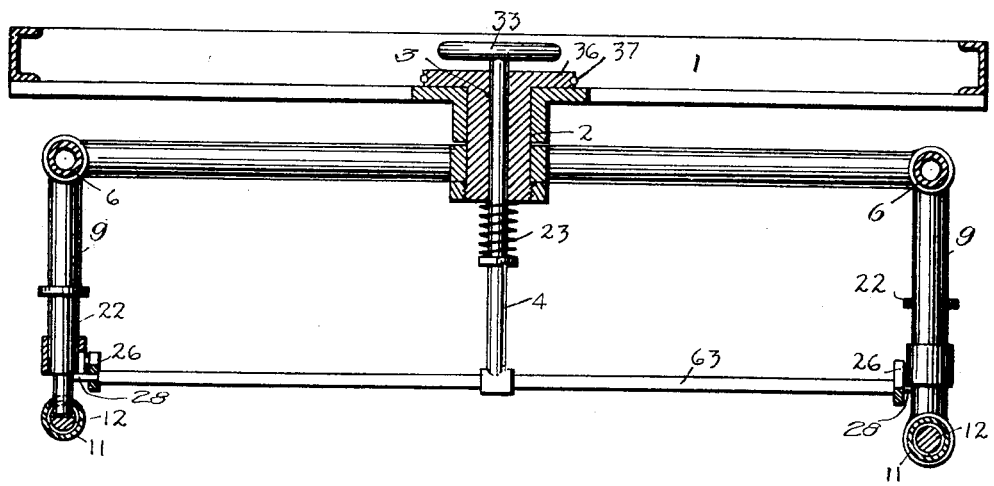

UNITED STATES PATENT OFFICE.

BERNARD PÉDUCASSE, OF LYON, FRANCE.

AUTOMATIC FENDER.

1,107,995. Specification of Letters Patent. Patented Aug. 18, 1914.

Application filed December 13, 1909. Serial No. 532,792.

*To all whom it may concern:*

Be it known that I, BERNARD PÉDUCASSE, a citizen of the Republic of France, and a resident of Lyon, France, have invented a certain new and useful Automatic Fender, of which the following is a full, clear, and exact description.

This invention relates to an automatic fender for cars, vehicles and the like, which is adapted to be extended automatically by the impact of a person on the vehicle, or by manual means operated by the motorman.

An object of the invention is the provision of a device which will be simple in construction, inexpensive in make-up, positive and quick in its operation, and easily operated.

A further object of the invention is the provision of a fender rotatably supported on the vehicle, with means for manually controlling the movement of the said fender.

These and other objects, together with the construction and combination of parts, will be more particularly described in the specification and pointed out in the claims.

Reference is to be had to the accompanying drawings forming a part of this specification, in which similar characters of reference indicate corresponding parts in all the views, and in which—

Figure 1 is a diagrammatic sectional view of the front end of a car or other vehicle, with the device attached thereto and in normal position; Fig. 2 is a front view in elevation, partly broken away; Fig. 3 is a horizontal section, on line 1—1 of Fig. 1, parts being broken away to show the underlying structure; while Fig. 4 is a vertical transverse section through the sleeve in which the vertical shaft is located, and through one of the latches.

Referring more particularly to the separate parts of the structure, 1 indicates the body of a car or vehicle provided with a vertical opening 2 in which is rotatably supported a sleeve 3; this sleeve is provided with a central opening in which a shaft 4 is slidably supported, the said shaft rotating under certain conditions with the sleeve.

Fixed on the sleeve 3 in any suitable manner, and held from downward movement by means of a collar 5, is the fender carrying frame 6 of the fender; this frame is adapted to rotate with the sleeve 3 relatively to the body 1, and to this end is provided with an anti-friction device, such as a roller 7, which bears against a guide, such as a bracket 8, fixed on the under side of the body 1. This frame 6 is further provided with downwardly extending brackets 9 and 10 forming supports for the tubes 11 of the fender, said tubes extending downwardly and forwardly. In telescoping relation with the tubes 11, and at the front ends thereof, are the bars 12, provided at their forward ends with the frame 13. This frame carries rollers 60 and 61 over which travels an endless belt 14. One of the rollers 61 is fixed on a shaft 15, which is provided with gears 16 meshing with other gears 17 on the shafts 18; each shaft 18 is provided with a roller 19 which engages the ground when the bars 12 are projected forwardly from the tubes 11, thereby rotating the gears 16 and causing the upper surface of the belt 14 to move rearwardly, thereby drawing a person or any obstacle on to the fender. The forward end of the frame 13 is provided with a roller 20 adapted to prevent the nose of the frame digging into any obstacle that might come into its path.

The bars 12 are adapted to be projected out of the tubes 11 by means of the springs 21, being locked in their inner or non-extended or non-projected position by the latches 22; these latches are in the form of lugs projecting downwardly from points adjacent the ends of a transverse bar 63 secured to the lower end of the shaft 4; the latches are adapted to engage in the alined openings in the tubes 11 and the bars 12 to lock the bars in their inner or non-projected position, and are normally held in the before-mentioned openings by means of a spring 23 engaging the under side of the sleeve 3 and a collar 24 fixed on the shaft 4.

There are three ways in which the latches 22 may be operated, whereby the bars 12 may be released, the fender being thereby projected. These ways are by means of a manual control and by means of two automatic controls. Fixed to the front end of the frame 6 in any suitable manner is a curtain or apron 25, the lower end of which is fixed to a pair of levers 26; these levers are pivoted at their rear ends to the tubes 11, and intermediate of their ends are provided with slots 27 which are adapted to engage the reduced ends of the bar 63, which ends form pins 28. When an obstacle hits the curtain or apron 25, thereby distending it rearwardly, the levers 26 are raised, the latches 22 then coming out of engagement with the tubes 11 and the bars 12; that is, the pin-and-slot connection is broken, the springs 21 being then permitted to urge the bars 12 forwardly, or project them, the fender being then in operative or taking-up position.

While the curtain or apron 25 will take care of an obstacle coming in contact with the vehicle at a low point, it is also desirable that any obstacle striking the vehicle at a high point shall be taken care of; for this purpose a dashboard 29 is provided, pivoted at its upper end to the front part of the vehicle, and in pivotal relation at its lower end, through the medium of a rod 30, with a wedge 32, a guide 31 being provided for the rod. This wedge is adapted to slide on top of the sleeve 3 and engage a head 33 on the shaft 4, so that when an obstacle strikes the movable dashboard 29 the wedge will force the shaft 4 upwardly, thereby bringing the latches 22 out of engagement with the tubes 11 and the bars 12, the bars 12 being thereby brought to projected position and the fender being extended.

Manual control for operating the latches 22 consists in a lever 34, pivoted intermediate its length in any well known manner, and in pivotal relation at its lower end with a bracket 35 on the movable dashboard 29; thus, the dashboard can be moved manually as well as automatically to release the said latches and permit the fender to come into projected position.

It sometimes happens that a person or an obstacle lines in the path of the wheels and yet not directly in front of the fender; therefore, the fender is adapted to be swung and can be controlled by the motorman or operator of the vehicle. To this end the sleeve 3 is provided with a pulley 36 engaging an endless flexible connection 37, the said connection engaging a pulley 38 mounted on a vertical shaft 39. This shaft has a beveled gear 40 at its upper end which meshes with a corresponding gear 41 fixed to a hand crank 42. Rotation of the hand crank by the motorman or operator of the vehicle will swing the fender to one side of the vehicle, or the other, thereby adjusting it to the most convenient position for picking up a person or obstacle in the path of the vehicle.

In order that the fender may be returned to non-extended or non-projected position after having been projected, the rear ends of the bars 12 are fixed to cables 43 adapted to be wound on reels 44, which reels may be rotated in any well known manner. Thus, by winding the cables 43 on the reels the bars 12 may be brought into position in the tubes 11 against the tension of the springs 21 until the openings in the tubes 11 and the bars 12 come into alinement, when the spring 23 will automatically force the latches 22 into engagement with the said openings, the fender being thereby locked in non-projected position.

The operation of the structure will be readily understood when taken in connection with the above description; as the vehicle approaches a person or obstacle in its path the motorman, observing the obstacle, may, by rotating the crank 42, bring the fender to the proper angle so that it will pick up the obstacle, operation of the lever 34 bringing the fender to its projected position. If, however, the motorman should be inattentive and fail to see the obstacle, which may come in contact with the dashboard 29 or the flexible apron 25, such engagement will operate the parts described, and the latches 22 will come out of engagement with the bars and tubes 12 and 11, thereby permitting the spring 21 to bring the fender to projected position. In such position the roller 19 engages the ground, and through its rotation therewith, and its driving connection with the gears 16 and 17, will turn the belt 14 so that the obstacle will be taken up on the belt and deposited on the fender out of the way of the wheels of the vehicle.

Having thus described my invention, what I claim as new and desire to secure by Letters Patent is:—

1. In a structure such as described, and in combination with a vehicle, a fender, mounting means therefor, the fender and means being rotatably carried by the vehicle, means for retaining the fender in one position in the said mounting means, means for releasing said fender and means for projecting the said fender when the retaining means is released, the means for projecting the fender being operable in whatever direction the fender may be extended relatively to the vehicle.

2. In a structure such as described, and in combination with a vehicle, a fender and mounting means therefor carried by the vehicle, a movable dashboard, means for retaining the fender in one position in the said mounting means, and devices engaging the dashboard and the fender structure whereby the fender may be projected relatively to the said mounting means.

3. In a structure such as described, and in combination with a vehicle, a fender, mounting means therefor, the fender and the said means being rotatably carried by the vehicle, means whereby the fender may be retained in one position in the mounting means, means whereby the fender may be projected relatively to the mounting means, a guide track on the said vehicle, a roller carried by the mounting means and adapted to engage the track, and means for rotating the said fender and mounting means relatively to the vehicle.

4. In a structure such as described, and in combination with a vehicle, a fender, mounting means therefor, mechanism for locking the fender in a certain position in the mounting means, a movable dashboard, and mechanism between the dashboard and the locking means, whereby the fender may be projected relatively to the said mounting means.

5. In a structure such as described, and in combination with a vehicle, a fender, mounting means therefor, the fender being movable in the mounting means, mechanism for locking the fender against movement, a movable dashboard for releasing the said locking means, and a lever for manually controlling the said movable dashboard.

6. In a structure such as described, and in combination with a vehicle, a fender, mounting means therefor, a shaft having a latch connected thereto, the latch being adapted to lock the fender against movement relatively to the mounting means, a head on the said shaft, a wedge adapted to engage the head in order to release the latch, and a movable dashboard articulated with the said wedge.

7. In a structure such as described, and in combination with a vehicle, a fender and mounting means therefor carried by the vehicle, a shaft having a latch connected thereto, the latch being adapted to prevent movement of the fender relatively to the mounting means, a head on the shaft, a wedge adapted to engage the said head in order to release the latch, a movable dashboard in operative relation to the said wedge, and a lever for moving the said dashboard.

8. In a structure such as described, and in combination with a vehicle, a fender and mounting means therefor carried by the vehicle, a latch for maintaining the fender in a certain position relatively to the mounting means, a lever for operating the said latch, and a flexible curtain for operating the said lever, the fender and mounting means being rotatably mounted on the vehicle, and the latch, lever and curtain being operable in any position of the fender and mounting means.

9. In a structure such as described, and in combination with a vehicle, a fender and mounting means therefor carried by the vehicle, the fender being movable relatively to the mounting means, a latch for preventing movement of the fender, an upper control for the said latch, a lower control for the said latch and a manual control for the said latch, the fender and the mounting means being rotatably mounted in position, and the said latch being operable in any position of the fender and the mounting means relatively to the said vehicle.

10. In a structure such as described, and in combination with a vehicle, a fender and mounting means therefor, the fender being movable relatively to the mounting means, the fender and the mounting means being movable relatively to the vehicle, the mounting means comprising tubes and the fender comprising bars engaging in the tubes, latches for maintaining the tubes and bars in locked position, levers for operating the said latches and a flexible apron connected to the said fender and the said levers, all of the parts being operable in any position of the fender and mounting means relatively to the vehicle.

11. In a structure such as described, and in combination with a vehicle, a frame carried by the vehicle, a plurality of tubes carried by the frame, a fender comprising bars slidably mounted within the tubes, means for moving the bars in the tubes, latches engaging the tubes and bars for holding the fender in position, and means for releasing the said latches, the said means being adapted to be operated by the impact of an obstacle therewith.

12. In a structure such as described, the combination with a vehicle, of a tubular member mounted to turn in the frame of the vehicle, a fender carried by the said member and having an extension, a shaft mounted in the member and carrying means for locking the extension of the fender in retracted position, and means for operating said member.

13. In a structure such as described, the combination with a vehicle, of a tubular member mounted in the frame of the vehicle and provided with a pulley, a fender carried by the member and having an extension, a shaft mounted in the tubular member and carrying means for locking the extension of the fender in retracted position, a shaft provided with a pulley, a belt passing around said pulley and the pulley of the tubular member, and means for operating said shaft.

14. In a structure such as described, the combination with a vehicle, of a member mounted to turn in the frame of the vehicle and provided with a bore, means for turning the member, a frame carried by said member, a fender carried by the frame and having a slidable and spring pressed member, a spring pressed shaft mounted in the bore of said member and carrying means for locking the slidable member of the fender in retracted position, and means for operating the shaft to release the slidable member of the fender.

In testimony whereof I have signed my name to this specification in the presence of two subscribing witnesses.

BERNARD PÉDUCASSE.

Witnesses:
 Thomas N. Browne,
 Marin Vachory.

---

Copies of this patent may be obtained for five cents each, by addressing the "Commissioner of Patents, Washington, D. C."